(12) United States Patent
Miura

(10) Patent No.: US 9,802,479 B2
(45) Date of Patent: Oct. 31, 2017

(54) TANK SEALING VALVE AND EVAPORATION FUEL PROCESSING DEVICE INCLUDING THE SAME

(71) Applicant: DENSO CORPORATION, Kariya, Aichi-pref. (JP)

(72) Inventor: Yuichiro Miura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/227,087

(22) Filed: Aug. 3, 2016

(65) Prior Publication Data
US 2017/0036532 A1    Feb. 9, 2017

(30) Foreign Application Priority Data

Aug. 6, 2015  (JP) .................... 2015-155724

(51) Int. Cl.
| | | |
|---|---|---|
| B60K 15/035 | (2006.01) | |
| B60K 15/03 | (2006.01) | |
| F02M 25/08 | (2006.01) | |
| F02D 41/00 | (2006.01) | |

(52) U.S. Cl.
CPC .. B60K 15/03519 (2013.01); B60K 15/03504 (2013.01); F02M 25/0836 (2013.01); F02M 25/0854 (2013.01); F02M 25/0872 (2013.01); B60K 2015/03302 (2013.01); B60K 2015/03514 (2013.01); F02D 41/004 (2013.01); F02M 2025/0845 (2013.01)

(58) Field of Classification Search
CPC ........ B60K 15/03519; B60K 15/03504; B60K 15/0319; B60K 15/035; B60K 2015/03302; B60K 2015/03514; B60K 2015/03414; B60K 2015/0319; B60K 2015/03263; B60K 2015/03585; F02M 25/0854; F02M 25/0872; F02M 25/0836; F02M 25/0818; F02M 25/089; F02M 2025/0845; F02D 41/004; F02D 41/0032; F02D 41/003

See application file for complete search history.

(56) References Cited

U.S. PATENT DOCUMENTS

| | | | | |
|---|---|---|---|---|
| 5,211,151 A | * | 5/1993 | Nakajima | ........ B60K 15/03519 123/516 |
| 5,579,742 A | * | 12/1996 | Yamazaki | ........ B60K 15/03504 123/516 |
| 5,813,434 A | * | 9/1998 | Horiuchi | ........ B60K 15/03519 137/202 |

(Continued)

*Primary Examiner* — Lindsay Low
*Assistant Examiner* — George Jin
(74) *Attorney, Agent, or Firm* — Nixon & Vanderhye PC

(57) ABSTRACT

A tank sealing valve arranged in a passage network through which a fluid flows between a fuel tank and a canister includes a first valve unit and a second valve unit. A first port and a second port of three ports included in an outer case body of the first valve unit are open toward a first chamber of two chambers divided by a diaphragm or a bellows of the first valve unit, and a third port of the three ports is open toward a second chamber of the two chambers. A valve body of the first valve unit includes a through passage penetrating a valve portion and a column portion of the valve body. The valve portion communicates with the first port and the second chamber through the through passage in a case where the first port is closed. The second valve unit opens and closes the third port.

16 Claims, 9 Drawing Sheets

(56) References Cited

U.S. PATENT DOCUMENTS

| | | | |
|---|---|---|---|
| 6,533,002 B1 | 3/2003 | Kobayashi et al. | |
| 2004/0055582 A1* | 3/2004 | Yanase | F02M 25/0836 123/519 |
| 2015/0316007 A1* | 11/2015 | Williams | F02M 25/0872 137/583 |
| 2016/0186699 A1* | 6/2016 | Fukui | B60K 15/035 123/520 |
| 2016/0341141 A1* | 11/2016 | Dudar | F02D 41/22 |

* cited by examiner

TANK SEALING VALVE AND EVAPORATION FUEL PROCESSING DEVICE INCLUDING THE SAME

CROSS REFERENCE TO RELATED APPLICATION

This application is based on Japanese Patent Application No. 2015-155724 filed on Aug. 6, 2015, the disclosure of which is incorporated herein by reference.

TECHNICAL FIELD

The present disclosure relates to a tank sealing valve and an evaporation fuel processing device.

BACKGROUND

Conventionally, it is known that an evaporation fuel processing device is arranged in a vehicle such as an automobile, so as to prevent an evaporation fuel generated in a fuel tank from being leaked to an atmosphere. Further, it is known that a tank sealing valve opening and closing a passage between the fuel tank and a canister is arranged in the evaporation fuel processing device. Furthermore, according to JP2001-206082A, the tank sealing valve includes two valve units each of which opens and closes by using an electromagnetic solenoid.

The valve units are controlled to open and close by an electric control unit (ECU) that energizes and controls an operation of an internal combustion engine.

The tank sealing valve controls a first valve unit of the valve units to open so as to control the fluid to flow with a relatively large flow amount. The tank sealing valve controls the first valve unit to close and a second valve unit of the valve units to open so as to control the fluid to flow with a relatively small flow amount that is smaller than the relatively large flow amount.

In other words, a passage network arranged between the fuel tank and the canister includes a large passage through which the fluid flows with the relatively large flow amount, and a small passage through which the fluid flows with the relatively small flow amount. The first valve unit opens and closes the large passage, and the second valve unit opens and closes the small passage. Thus, the ECU can select one of the relatively large flow amount and the relatively small flow amount to control the fluid between the fuel tank and the canister.

Since it is requested to reduce a fuel consumption and an arrangement space in the vehicle, the tank sealing valve including the two valve units is also requested to reduce the fuel consumption and the arrangement space.

In the first valve unit opening and closing the large passage, a spring having a relatively large biasing force is used to surely block an interior of the fuel tank by a valve body of the first valve unit. Then, a relatively large-sized electromagnetic solenoid is used to drive the valve body by cancelling the relatively large biasing force. Thus, in the above tank sealing valve, an improvement the fuel consumption and the arrangement space is being requested.

SUMMARY

It is an object of the present disclosure to provide a tank sealing valve which reduces a fuel consumption and an arrangement space.

According to the present disclosure, the tank sealing valve arranged in a passage network through which a fluid flows between a fuel tank and a canister includes a first valve unit and a second valve unit that are energized and controlled by a control portion to open and close. The first valve unit opens to control the fluid to flow with a relatively large flow amount. The first valve unit closes and the second valve unit opens to control the fluid to flow with a relatively small flow amount that is smaller than the relatively large flow amount.

The first valve unit includes an outer case body that includes at least three ports which include inlets and outlets of the fluid, a valve body that is movably received in the outer case body and includes a valve portion opening and closing a first port of the three ports and a column portion extending from the valve portion, a spring that biases the valve body in a direction closing the first port, an electromagnetic solenoid cancelling a biasing force of the spring and driving the valve body in a direction opening the first port, and a diaphragm or a bellows that is arranged between the column portion and the outer base body and divides an interior of the outer case body into at least two chambers.

The valve portion is received in a first chamber of the two chambers and the column portion protrudes into a second chamber of the two chambers. The first port and a second port of the three ports are open toward the first chamber and a third port of the three ports is open toward the second chamber. The valve body includes a through passage penetrating the valve portion and the column portion. The valve portion communicates with the first port and the second chamber through the through passage in a case where the first port is closed. The second valve unit opens and closes the third port.

When the diaphragm or the bellows is arranged between the column portion and the outer case body, the through passage is provided in the valve body. Therefore, when the first port is closed, a pressure of an interior of the fuel tank and a pressure of an interior of the canister which are applied to the valve body can be set to cancel each other. Therefore, a sealing capability of the valve portion relative to the first port is improved, and it is unnecessary to increase a biasing force of the spring.

The third port is provided to be opened and closed by the second valve unit. When a negative pressure or a positive pressure generated in the interior of the fuel tank is released, the third port can assist the valve body to move in a valve-opening direction.

Thus, in the first valve unit, the biasing force of the spring can be reduced, and the electromagnetic solenoid can be miniaturized. As a result, the tank sealing valve can have a configuration to reduce a fuel consumption and an arrangement space of the tank sealing valve.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
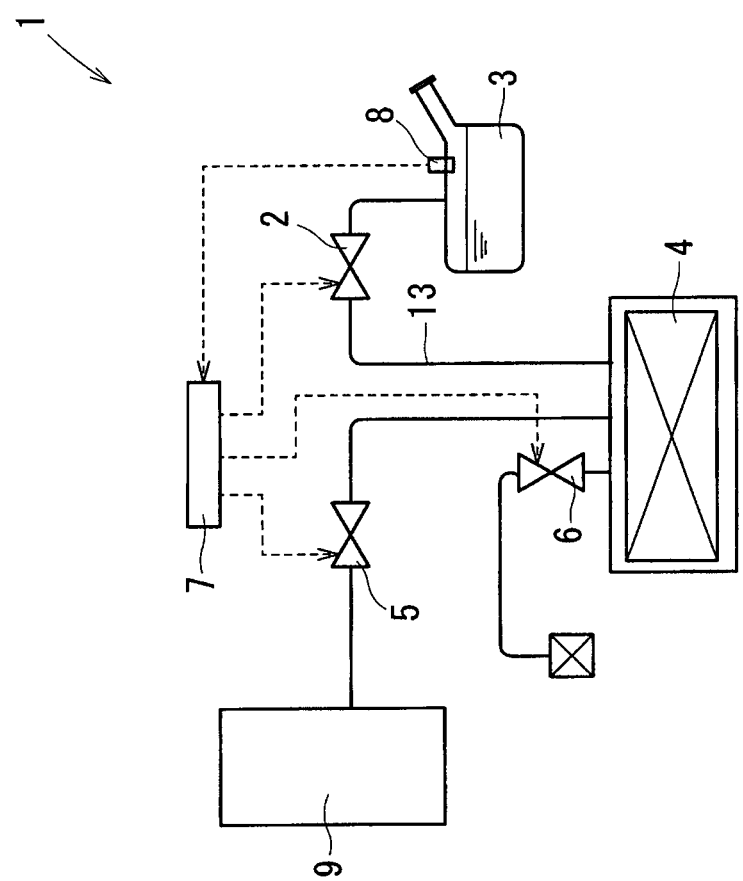
FIG. 1 is a diagram showing a configuration of an evaporation fuel processing device, according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, embodiments of the present disclosure will be described.

First Embodiment

Figure 2:
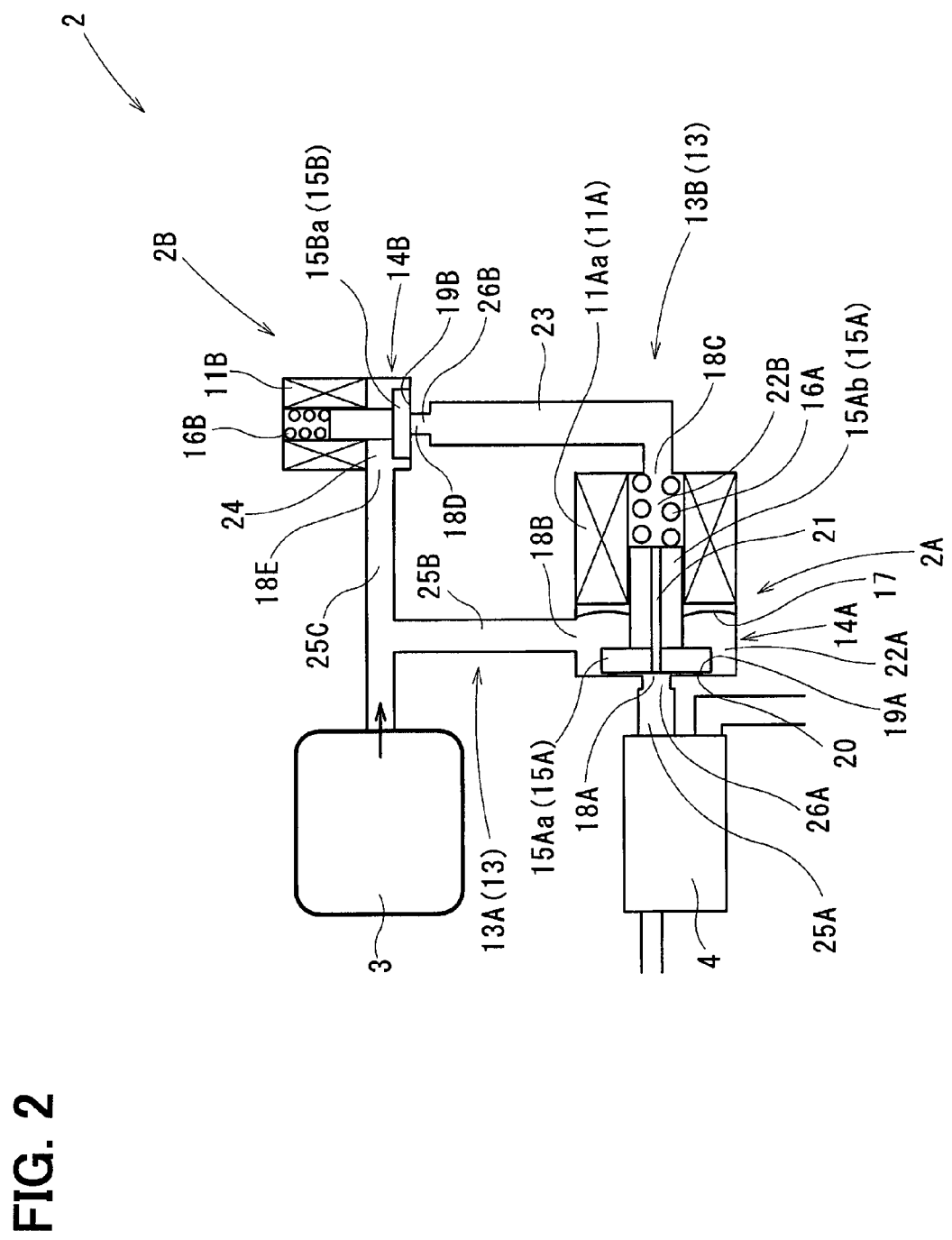
FIG. 2 is a diagram showing a configuration of a tank sealing valve of when being closed, according to the first embodiment.
Figure 3:
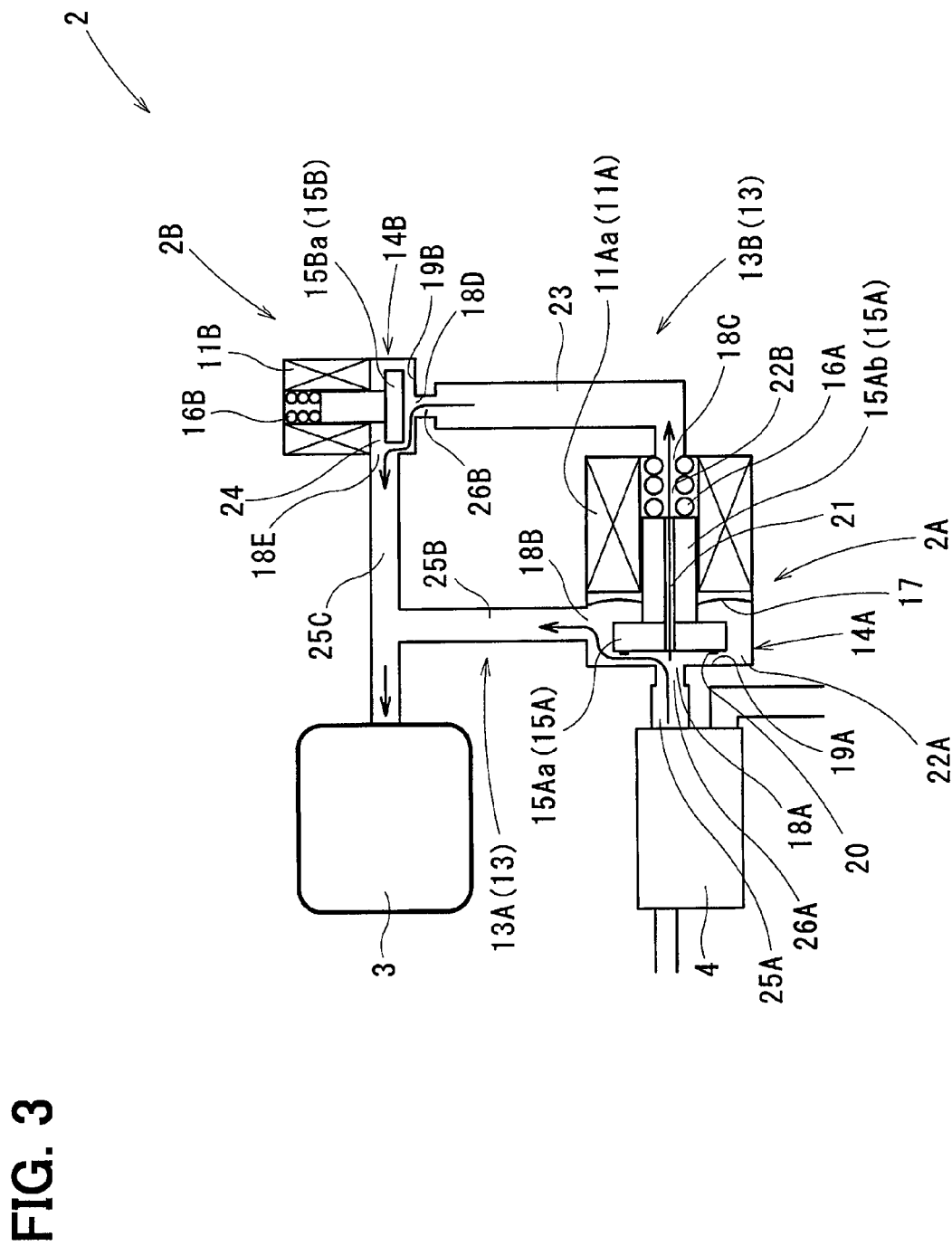
FIG. 3 is a diagram showing a configuration of the tank sealing valve of when being opened, according to the first embodiment.

According to a first embodiment of the present disclosure, referring to FIGS. 1 to 3, a configuration of an evaporation fuel processing device 1 and a configuration of a tank sealing valve 2 will be described.

The evaporation fuel processing device 1 is arranged in a vehicle including an automobile. The evaporation fuel processing device 1 prevents an evaporation fuel generated in a fuel tank 3 from being leaked to an exterior. The evaporation fuel processing device 1 includes the tank sealing valve 2, a canister 4, a purge valve 5, an atmosphere opening valve 6, an electric control unit (ECU) 7, and a pressure sensor 8. According to the present embodiment, the ECU 7 is a control portion.

The canister 4 absorbs and stores a fuel that is the evaporation fuel generated in the fuel tank 3. The tank sealing valve 2 opens and closes a part between the fuel tank 3 and the canister 4. The purge valve 5 opens and closes a part between the canister 4 and an intake line 9 of an internal combustion engine. The atmosphere opening valve 6 opens and closes a part between the canister 4 and the exterior.

The ECU 7 controls an operation of the internal combustion engine, based on signals inputted from various sensors including the pressure sensor 8. The tank sealing valve 2, the purge valve 5, and the atmosphere opening valve 6 are energized and controlled by the ECU 7 to open and close by using an electromagnetic solenoid.

The pressure sensor 8 detects an inner pressure of the fuel tank 3. The ECU 7 executes various control modes to instruct the tank sealing valve 2, the purge valve 5, and the atmosphere opening valve 6, based on a detected value obtained from the pressure sensor 8.

The tank sealing valve 2 includes two valve units 2A and 2B which open and close by using electromagnetic solenoids 11A and 11B, respectively. The tank sealing valve 2 is arranged at a part of a passage network 13 through which a fluid flows between the fuel tank 3 and the canister 4. The valve units 2A and 2B which are a first valve unit 2A and a second valve unit 2B are energized and controlled by the ECU 7 to open and close.

When the ECU 7 controls the fluid to flow through the part between the fuel tank 3 and the canister 4, the ECU 7 selects between a relatively large flow amount and a relatively small flow amount. In other words, the passage network 13 includes a large passage 13A through which the fluid flows with the relatively large flow amount, and a small passage 13B through which the fluid flows with the relatively small flow amount. The valve units 2A and 2B open the large passage 13A and the small passage 13B, respectively, so as to control the fluid to flow with the relatively large flow amount and the relatively small flow amount, respectively. According to the present embodiment, the relatively small flow amount is smaller than the relatively large flow amount. The ECU 7 controls the first valve unit 2A to open when the relatively large flow amount is requested, and controls the first valve unit 2A to close and controls the second valve unit 2B to open when the relatively small flow amount is requested.

The first valve unit 2A includes an outer case body 14A, a valve body 15A, a spring 16A, the electromagnetic solenoid 11A, and a diaphragm 17.

The outer case body 14A that is made of a resin material receives the valve body 15A, the spring 16A, and the electromagnetic solenoid 11A. The outer case body 14A includes at least three ports 18A, 18B, and 18C which are a first port 18A, a second port 18B, and a third port 18C and include inlets and outlets of the fluid.

The valve body 15A is movably received in to the outer case body 14A to open and close the first port 18A. The valve body 15A includes a valve portion 15Aa that is seated on a valve seat 19A arranged around the first port 18A, and a column portion 15Ab that is thinner than the valve portion 15Aa. The column portion 15Ab extends from the valve portion 15Aa.

The valve portion 15Aa includes a protrusion 20 that is a ring shape and is in contact with and presses the valve seat 19A when the valve body 15A closes the first port 18A. Since the protrusion 20 is in contact with and presses the valve seat 19A, a flow of the fluid between an exterior and an interior of the outer case body 14A through the first port 18A is interrupted (blocked).

The valve portion 15Aa is a disc shape, and the column portion 15Ab is a cylinder shape. The valve portion 15Aa is coaxial to the column portion 15Ab.

The valve body 15A further includes a through passage 21 penetrating the valve portion 15Aa and the column portion 15Ab. The column portion 15Ab includes a magnetic part, and the valve body 15A can move by an attractive force that is magnetic and is generated by the electromagnetic solenoid 11A.

The spring 16A is arranged between the outer case body 14A and the column portion 15Ab. The spring 16A biases the valve body 15A in a direction closing the first port 18A, and controls the protrusion 20 to be in contact with and press the valve seat 19A.

The electromagnetic solenoid 11A drives the valve body 15A in a direction opening of the first port 18A by cancelling a biasing force of the spring 16A. The electromagnetic solenoid 11A includes a coil 11Aa that is energized and controlled by the ECU 7. The attractive force that is generated in inner periphery of the coil 11Aa drives the valve body 15A.

The diaphragm 17 is arranged between the column portion 15Ab and the outer case body 14A, and divides the interior of the outer case body 14A into two chambers 22A, 22B which are a first chamber 22A and a second chamber 22B. While the valve portion 15Aa is received in the first chamber 22A, the column portion 15Ab protrudes into the second chamber 22B. Further, the first port 18A and the second port 18B are open toward the first chamber 22A, and the third port 18C is open toward the second chamber 22B. When the valve portion 15Aa closes the first port 18A, the second chamber 22B still communicates with the first port 18A through the through passage 21. The spring 16A and the electromagnetic solenoid 11A are received in the second chamber 22B. The third port 18C is opened and closed by the second valve unit 2B. According to the present embodiment, the third port 18C is connected with the fuel tank 3 through the second valve unit 2B.

The second valve unit 2B has a configuration substantially as the same as the first valve unit 2A. The second valve unit 2B includes an outer case body 14B, a valve body 15B, a spring 16B, and the electromagnetic solenoid 11B.

The outer case body 14B includes two ports 18D, 18E which are a fourth port 18D and a fifth port 18E and include inlets and outlets of the fluid. The valve body 15B opens and closes the fourth port 18D. The fourth port 18D is connected with the third port 18C through an inner passage 23 of the tank sealing valve 2.

Since a valve portion 15Ba of the valve body 15B opens and closes the fourth port 18D, the second valve unit 2B opens and closes the third port 18C. The inner passage 23 is a part of the passage network 13. The valve body 15B is movably received in a valve chamber 24 defined in the outer case body 14B. Both the fourth port 18D and the fifth port 18E are open toward the valve chamber 24.

The passage network 13 includes the large passage 13A and the small passage 13B. A group of passages of the large passage 13A and the small passage 13B are constituted by the inner passage 23, a first outer passage 25A, a second outer passage 25B, and a third outer passage 25C.

The first outer passage 25A includes a first end connected with the first port 18A, and a second end connected with the canister 4. In this case, the first port 18A is connected with the canister 4 through the first outer passage 25A. The second outer passage 25B includes a first end connected with the second port 18B, and a second end connected with the fuel tank 3. In this case, the second port 18B is connected with the fuel tank 3 through the second outer passage 25B. The third outer passage 25C that is connected with the second outer passage 25B and the second valve unit 2B is also connected with the fifth port 18E.

The large passage 13A includes the first outer passage 25A, the first port 18A, the first chamber 22A, the second port 18B, and the second outer passage 25B. The small passage 13B includes the first outer passage 25A, the first port 18A, the through passage 21, the second chamber 22B, the third port 18C, the inner passage 23, the fourth port 18D, the valve chamber 24, the fifth port 18E, and the third outer passage 25C.

When the first valve unit 2A opens, the large passage 13A is opened. When the first valve unit 2A closes and when the second valve unit 2B opens, the small passage 13B is opened.

The first outer passage 25A and the inner passage 23 include a first throttle portion 26A and a second throttle portion 26B, respectively. The first throttle portion 26A has a diameter greater than that of the second throttle portion 26B. The diameter of the second throttle portion 26B is greater than a diameter of the through passage 21. According to the present embodiment, the diameter of the first throttle portion 26A is a minimum diameter of a passage between the first port 18A and the canister 4, and the diameter of the second throttle portion 26B is a minimum diameter of a passage between the third port 18C and the fuel tank 3. In this case, the passage between the third port 18C and the fuel tank 3 is a part of the small passage 13B, and includes the inner passage 23, the fourth port 18D, the valve chamber 24, the fifth port 18E, and the third outer passage 25C. Further, since the through passage 21 is a cylindrical shape according to the present embodiment, the diameter of the through passage 21 is a minimum diameter of the through passage 21.

The ECU 7 executes a negative-pressure suppressing mode in which the ECU 7 introduces an atmospheric pressure into an interior of the fuel tank 3 through the canister 4, so as to release (cancel) a negative pressure generated in the interior of the fuel tank 3. The ECU 7 executes the negative-pressure suppressing mode, by closing the purge valve 5 and by opening the tank sealing valve 2 and the atmosphere opening valve 6. When the relatively large flow amount is selected during a valve-opening operation of the tank sealing valve 2 so as to release the negative pressure in an early stage, the ECU 7 opens the first valve unit 2A after opening the second valve unit 2B. In other words, the ECU 7 firstly opens the second valve unit 2B, and then opens the first valve unit 2A.

According to the present embodiment, a pressure of the interior of the fuel tank 3 is referred to as a tank pressure, and a pressure of an interior of the canister 4 is referred to as a canister pressure. Further, the direction closing the first port 18A is referred to as a valve-closing direction of the valve body 15A, and the direction opening the first port 18A is referred to as a valve-opening direction of the valve body 15A. The canister pressure is substantially equal to the atmospheric pressure.

According to the first embodiment, while the diaphragm 17 is arranged between the column portion 15Ab and the outer case body 14A, the through passage 21 is provided in the valve body 15A. Therefore, when the first port 18A is closed, the tank pressure and the canister pressure which are applied to the valve body 15A can be set to cancel each other.

In other words, when the first port 18A is closed, a pressure in the second chamber 22B is adjusted to be equal to the canister pressure by the through passage 21. Since the second port 18B always communicates with the interior of the fuel tank 3, a pressure in the first chamber 22A is equal to the fuel pressure. Thus, the tank pressure is applied to the valve portion 15Aa in the valve-closing direction, and the biasing force of the spring 16A and the canister pressure are applied to the column portion 15Ab in the valve-closing direction. The diaphragm 17 applies a pressure that is equal to a value obtained by subtracting the tank pressure from the canister pressure, to the column portion 15Ab in the valve-closing direction.

Thus, when the first port 18A is closed, the tank pressure and the canister pressure which are applied to the valve body 15A can cancel each other, by setting pressure-receiving surfaces of the valve portion 15Aa, the column portion 15Ab, and the diaphragm 17. Therefore, a sealing capability of the valve portion 15Aa relative to the first port 18A is improved, and it is unnecessary to increase the biasing force of the spring 16A.

The third port 18C is provided to be opened and closed by the second valve unit 2B. When the ECU 7 executes the negative-pressure suppressing mode to release the negative pressure by using the relatively large flow amount, the ECU 7 opens the first valve unit 2A after opening the second valve unit 2B.

Therefore, when the ECU 7 executes the negative-pressure suppressing mode, the third port 18C can assist the valve body 15A to move in the valve-opening direction.

Further, the ECU 7 can introduce the tank pressure (negative pressure) into the second chamber 22B in a case where the first valve unit 2A is closed and the second valve unit 2B is opened. Therefore, a force corresponding to a difference between the canister pressure and the tank pressure which is a force corresponding to a difference between the atmospheric pressure and the negative pressure is applied to the valve body 15A in the valve-opening direction.

Thus, when the ECU 7 executes the negative-pressure suppressing mode, the third port 18C can assist the valve body 15A to move in the valve-opening direction. Further, when the ECU 7 executes the negative-pressure suppressing mode, a force moving the valve body 15A in the valve-opening direction and the attractive force generated by the electromagnetic solenoid 11A can be reduced.

As the above description, in the first valve unit 2A, the electromagnetic solenoid 11A can be miniaturized, and the biasing force of the spring 16A can be reduced. As a result, the tank sealing valve 2 can have a configuration to reduce a fuel consumption and an arrangement space of the tank sealing valve 2.

Since the first throttle portion 26A has the diameter greater than that of the second throttle portion 26B, it is certain that the relatively large flow amount and the relatively small flow amount can be properly used.

Further, since the second throttle portion 26B has the diameter greater than that of the through passage 21, the ECU 7 can maintain the pressure in the second chamber 22B to a relatively low pressure that is lower than the canister pressure (atmospheric pressure) when the ECU 7 executes the negative-pressure suppressing mode. Therefore, when the ECU 7 executes the negative-pressure suppressing mode, the second throttle portion 26B can surely assist the valve body 15A to move in the valve-opening direction.

When the ECU 7 executes the negative-pressure suppressing mode to release the negative pressure by using the relatively small flow amount, the ECU 7 can control a change of a magnitude of the relatively small flow amount by controlling the electromagnetic solenoid 11B in a duty control.

Second Embodiment

Figure 4:
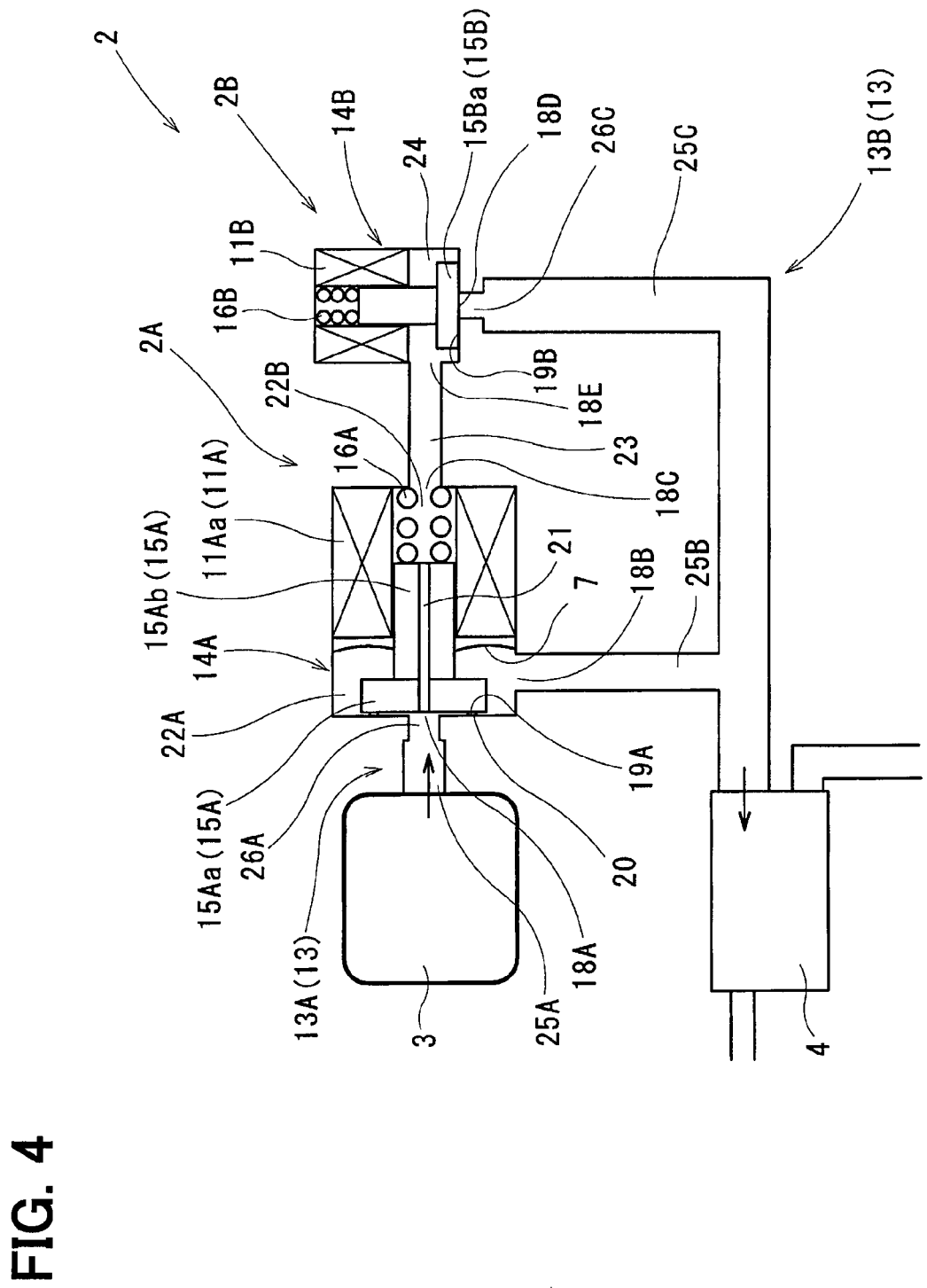
FIG. 4 is a diagram showing a configuration of the tank sealing valve of when being closed, according to a second embodiment of the present disclosure.
Figure 5:
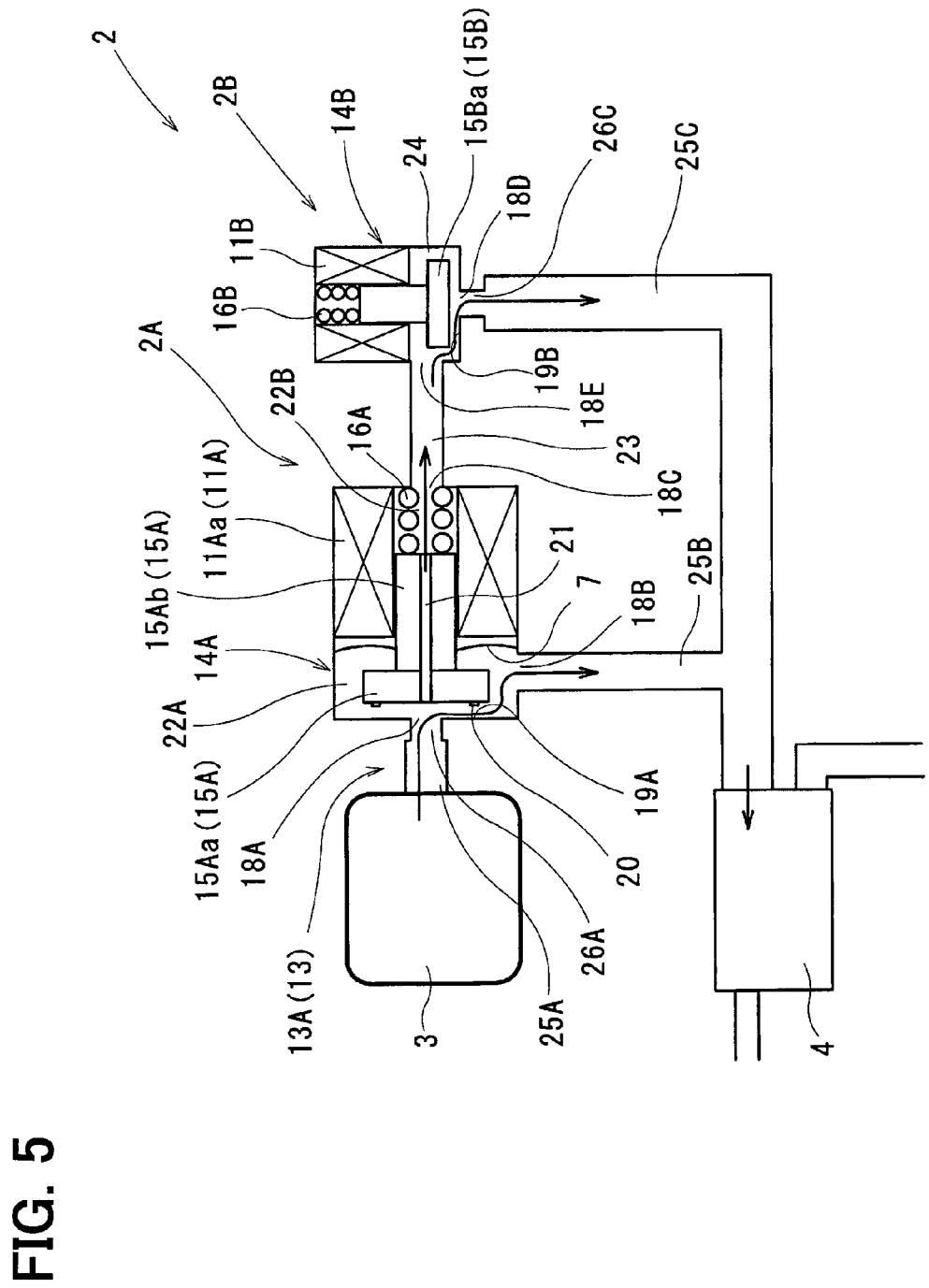
FIG. 5 is a diagram showing a configuration of the tank sealing valve of when being opened, according to the second embodiment.

Referring to FIGS. 4 and 5, the evaporation fuel processing device 1 and the tank sealing valve 2 according to a second embodiment of the present disclosure will be described.

In the passage network 13, the inner passage 23 is connected with the third port 18C and the fifth port 18E. Further, the second end of the first outer passage 25A is connected with the fuel tank 3, and the second end of the second outer passage 25B is connected with the canister 4. Furthermore, the third outer passage 25C is connected with the fourth port 18D.

The large passage 13A includes the first outer passage 25A, the first port 18A, the first chamber 22A, the second port 18B, and the second outer passage 25B. The small passage 13B includes the first outer passage 25A, the first port 18A, the through passage 21, the second chamber 22B, the third port 18C, the inner passage 23, the fifth port 18E, the valve chamber 24, the fourth port 18D, and the third outer passage 25C. The first port 18A is connected with the fuel tank 3 through the first outer passage 25A, the second port 18B is connected with the canister 4 through the second outer passage 25B, and the third port 18C is connected with the canister 4 through the second valve unit 2B.

When the first valve unit 2A opens, the large passage 13A is opened. When the first valve unit 2A closes and when the second valve unit 2B opens, the small passage 13B is opened.

The first outer passage 25A and the third outer passage 25C include the first throttle portion 26A and a third throttle portion 26C, respectively. The first throttle portion 26A has the diameter greater than that of the third throttle portion 26C. The diameter of the third throttle portion 26C is greater than a diameter of the through passage 21. According to the present embodiment, the diameter of the first throttle portion 26A is a minimum diameter of a passage between the first port 18A and the fuel tank 3, and the diameter of the third throttle portion 26C is a minimum diameter of a passage between the third port 18C and the canister 4. In this case, the passage between the third port 18C and the canister 4 is a part of the small passage 13B, and includes the inner passage 23, the fifth port 18E, the valve chamber 24, the fourth port 18D, and the third outer passage 25C. Further, since the through passage 21 is a cylindrical shape according to the present embodiment, the diameter of the through passage 21 is a minimum diameter of the through passage 21.

The ECU 7 executes a positive-pressure suppressing mode in which the ECU 7 introduces a positive pressure generated in the interior of the fuel tank 3 from the interior of the fuel tank 3 to the atmosphere through the canister 4, so as to release (cancel) the positive pressure. The ECU 7 executes the positive-pressure suppressing mode, by closing the purge valve 5 and by opening the tank sealing valve 2 and the atmosphere opening valve 6. When the relatively large flow amount is selected during the valve-opening operation of the tank sealing valve 2 so as to release the positive pressure in an early stage, the ECU 7 opens the first valve unit 2A after opening the second valve unit 2B.

According to the tank sealing valve 2 in the second embodiment, when the ECU 7 opens the tank sealing valve 2 in the positive-pressure suppressing mode, the ECU 7 opens the first valve unit 2A after opening the second valve unit 2B.

Therefore, when the ECU 7 executes the positive-pressure suppressing mode, the third port 18C can assist the valve body 15A to move in the valve-opening direction.

Further, the ECU 7 can introduce the canister pressure (atmospheric pressure) into the second chamber 22B in a case where the first valve unit 2A is closed and the second valve unit 2B is opened. Therefore, a force corresponding to a difference between the tank pressure and the canister pressure which is a force corresponding to a difference between the positive pressure and the atmospheric pressure is applied to the valve body 15A in the valve-opening direction.

Thus, when the ECU 7 executes the positive-pressure suppressing mode, the third port 18C can assist the valve body 15A to move in the valve-opening direction. Further, when the ECU 7 executes the positive-pressure suppressing mode, the force moving the valve body 15A in the valve-opening direction and the attractive force generated by the electromagnetic solenoid 11A can be reduced.

As the above description, in the first valve unit 2A, the electromagnetic solenoid 11A can be miniaturized, and the biasing force of the spring 16A can be reduced.

Since the first throttle portion 26A has the diameter greater than that of the third throttle portion 26C, it is certain that the relatively large flow amount and the relatively small flow amount can be properly used.

Further, since the third throttle portion 26C has the diameter greater than that of the through passage 21, the ECU 7 can maintain the pressure in the second chamber 22B to a relatively low pressure that is lower than the tank pressure (positive pressure) when the ECU 7 executes the positive-pressure suppressing mode. Therefore, when the ECU 7 executes the positive-pressure suppressing mode, the third throttle portion 26C can surely assist the valve body 15A to move in the valve-opening direction.

Other Embodiment

The present disclosure can change to various embodiments within the spirit and scope of the present disclosure.

Figure 6:
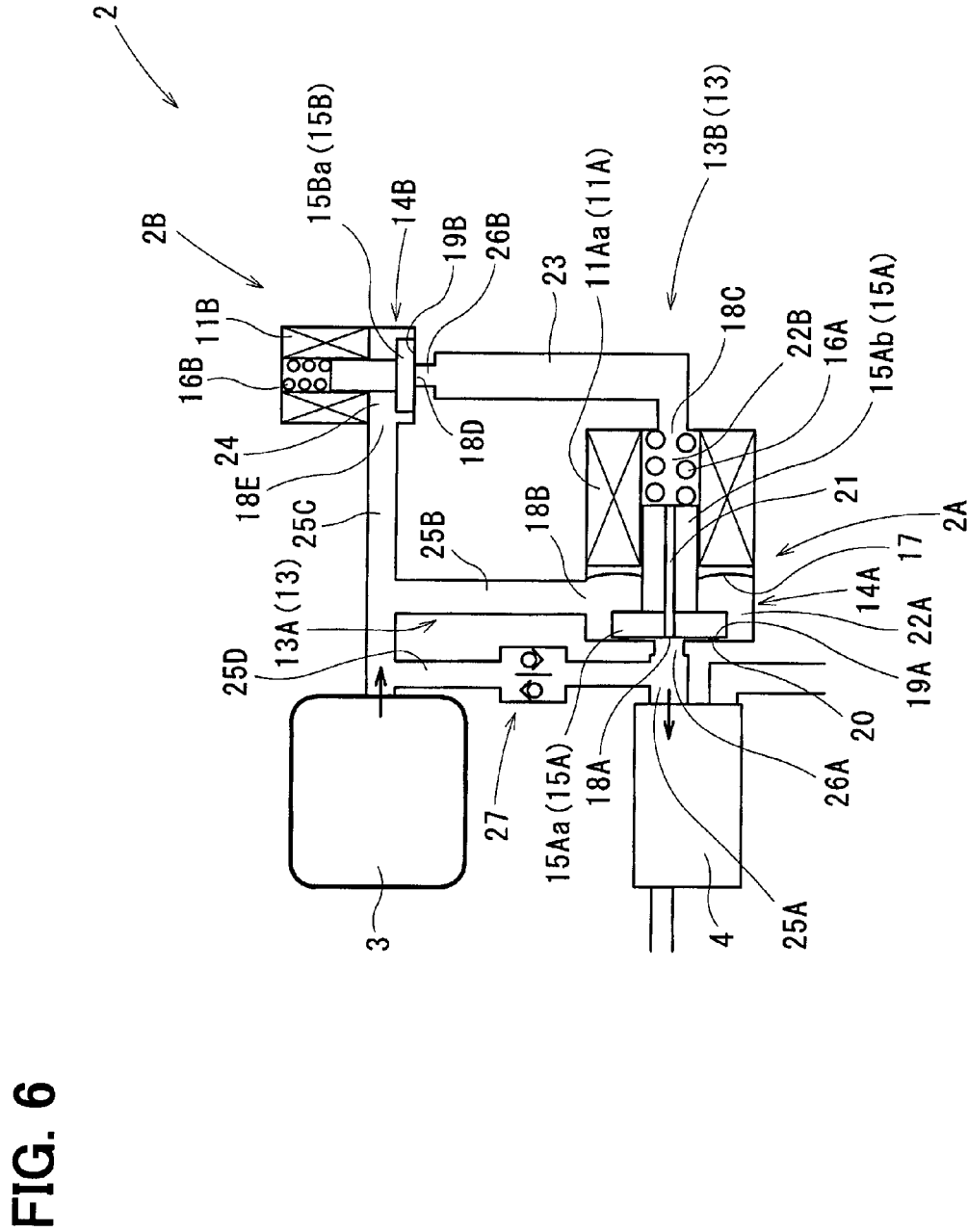
FIG. 6 is a diagram showing a configuration of the tank sealing valve, according to a first modification example.
Figure 7:
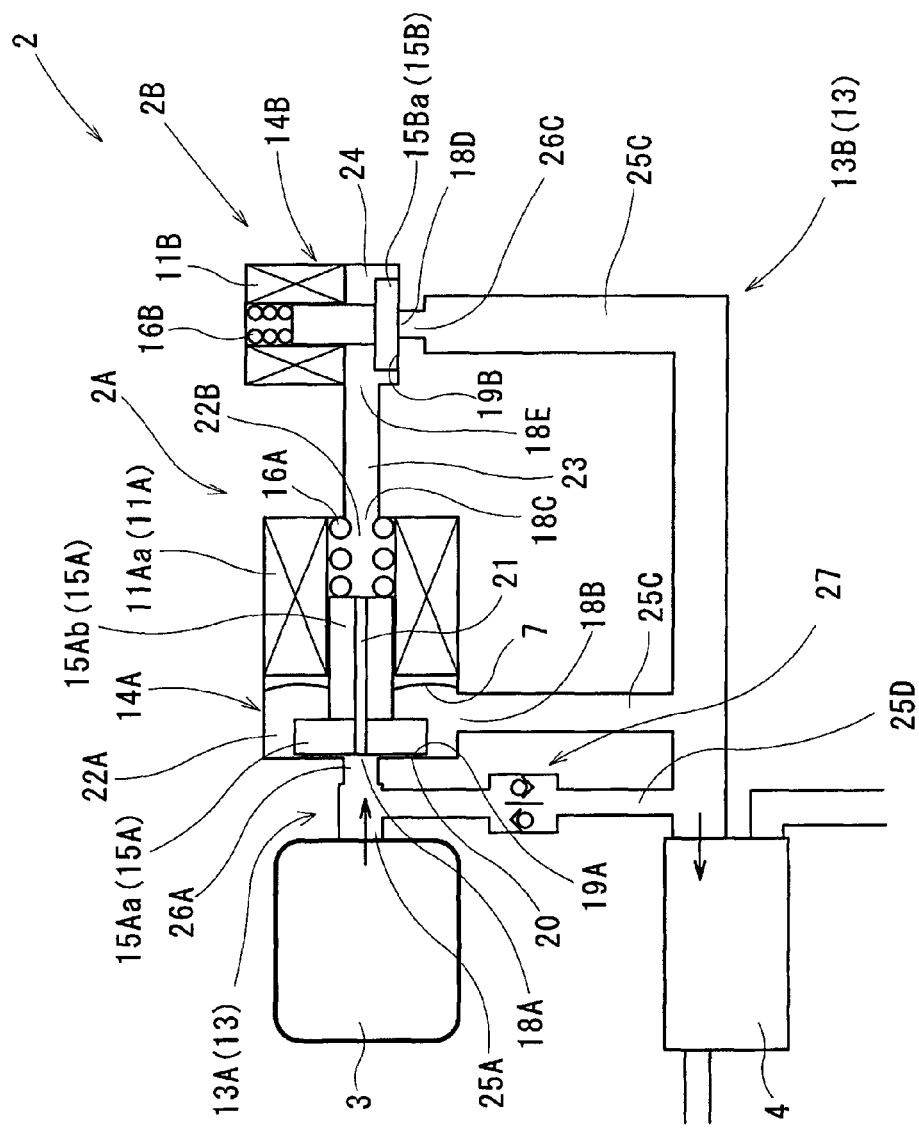
FIG. 7 is a diagram showing a configuration of the tank sealing valve, according to a second modification example.

As shown in FIGS. 6 and 7, the evaporation fuel processing device 1 may include a relief valve 27 that is a check valve opened by the negative pressure or the positive pressure generated in the interior of the fuel tank 3.

In this case, it is preferable that the relief valve 27 and the tank sealing valve 2 are arranged in a parallel relationship between the fuel tank 3 and the canister 4. Specifically, the passage network 13 further includes a fourth outer passage 25D, and the relief valve 27 is arranged in the fourth outer passage 25D.

The fourth outer passage 25D is connected with the first outer passage 25A and the second outer passage 25B by bypassing the tank sealing valve 2.

Since the relief valve 27 is provided, the positive pressure or the negative pressure generated in the interior of the fuel tank 3 can be released in a case where a malfunction of the tank sealing valve 2 occurs.

Figure 8:
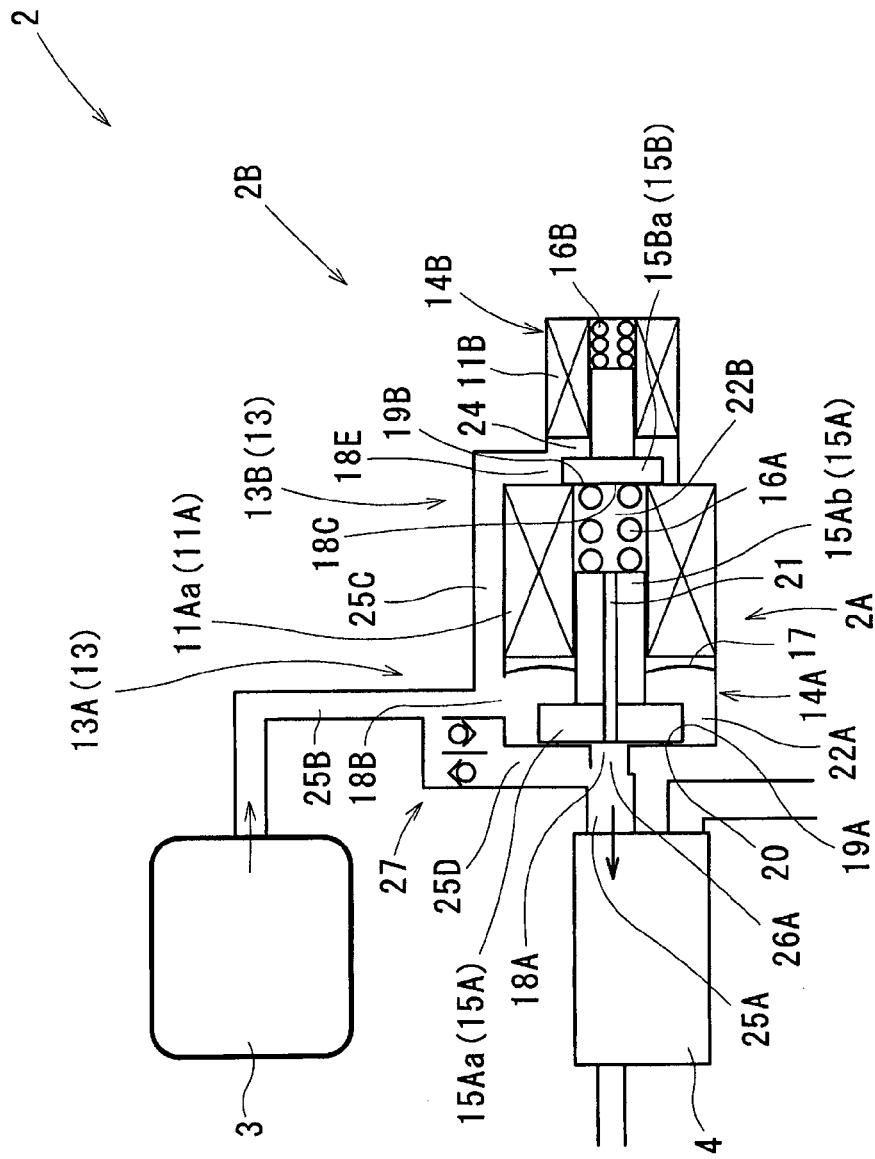
FIG. 8 is a diagram showing a configuration of the tank sealing valve, according to a third modification example.
Figure 9:
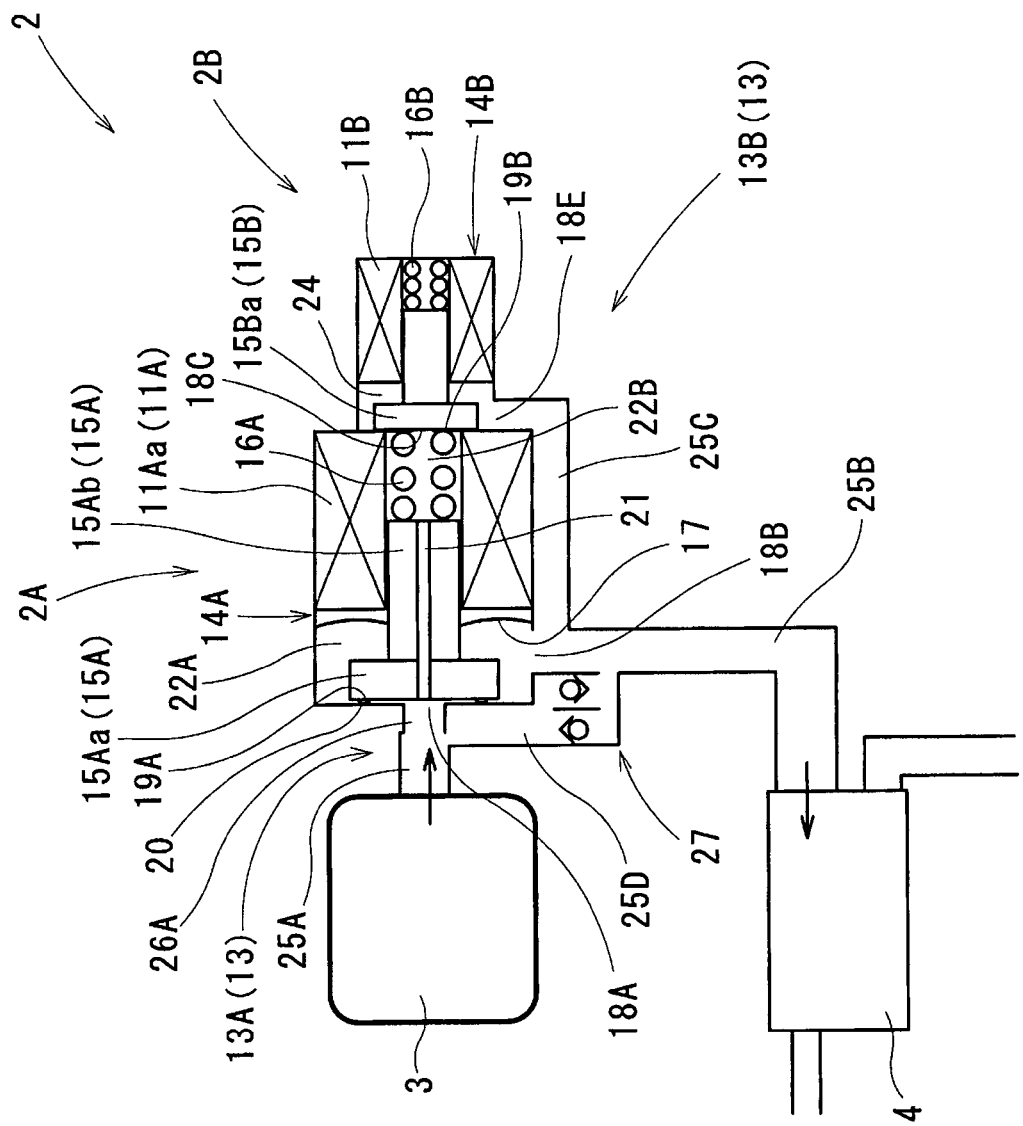
FIG. 9 is a diagram showing a configuration of the tank sealing valve, according to a fourth modification example.

As shown in FIGS. 8 and 9, a valve seat 19B to which the valve portion 15Ba is seated may be arranged at an outer surface of the outer case body 14A. In this case, since the inner passage 23 can be shortened or cancelled, the tank sealing valve 2 can be miniaturized and lightened. As a result, the tank sealing valve 2 can have a configuration to reduce the fuel consumption and the arrangement space of the tank sealing valve 2.

According to the above embodiments, in the tank sealing valve 2, the diaphragm 17 that is arranged between the column portion 15Ab and the outer case body 14A divides the interior of the outer case body 14A into the first chamber 22A and the second chamber 22B. However, the diaphragm 17 may be replaced by a bellows, and the bellows divides the interior of the outer case body 14A into the first chamber 22A and the second chamber 22B.

According to the above embodiments, in the valve body 15A of the tank sealing valve 2, the column portion 15Ab has the diameter less than that of the valve portion 15Aa. However, the column portion 15Ab may have a diameter greater than or equal to the diameter of the valve portion 15Aa. In other words, the diameter of the column portion 15Ab may be equal to a diameter of the valve body 15A.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A tank sealing valve arranged in a passage network through which a fluid flows between a fuel tank and a canister, comprising:
    a first valve unit and a second valve unit that are energized and controlled by a control portion to open and close, the first valve unit opening to control the fluid to flow with a relatively large flow amount, the first valve unit closing and the second valve unit opening to control the fluid to flow with a relatively small flow amount that is smaller than the relatively large flow amount,
    the first valve unit including
        an outer case body that includes at least three ports which include inlets and outlets of the fluid,
        a valve body that is movably received in the outer case body and includes a valve portion opening and closing a first port of the three ports and a column portion extending from the valve portion,
        a spring that biases the valve body in a direction closing the first port,
        an electromagnetic solenoid cancelling a biasing force of the spring and driving the valve body in a direction opening the first port, and
        a diaphragm or a bellows that is arranged between the column portion and the outer base body and divides an interior of the outer case body into at least two chambers, wherein
    the valve portion is received in a first chamber of the two chambers and the column portion protrudes into a second chamber of the two chambers, the first port and a second port of the three ports are open toward the first chamber and a third port of the three ports is open toward the second chamber,
    the valve body includes a through passage penetrating the valve portion and the column portion,
    the valve portion communicates with the first port and the second chamber through the through passage in a case where the first port is closed, and
    the second valve unit opens and closes the third port.

2. An evaporation fuel processing device including the tank sealing valve according to claim 1, wherein
    the first port is connected with the canister,
    the second port is connected with the fuel tank, and
    the third port is connected with the fuel tank through the second valve unit.

3. The evaporation fuel processing device according to claim 2, wherein
    when the control portion releases a negative pressure generated in an interior of the fuel tank, the control portion opens the first valve unit after opening the second valve unit.

4. The evaporation fuel processing device according to claim 2, further comprising:
    a passage between the first port and the canister; and
    a passage between the third port and the fuel tank, wherein
    the passage between the first port and the canister has a minimum diameter greater than a minimum diameter of the passage between the third port and the fuel tank.

5. The evaporation fuel processing device according to claim 2, further comprising:
a passage between the third port and the fuel tank, wherein
the passage between the third port and the fuel tank has a minimum diameter greater than a minimum diameter of the through passage.

6. The evaporation fuel processing device according to claim 4, wherein
the passage between the third port and the fuel tank has a minimum diameter greater than a minimum diameter of the through passage.

7. An evaporation fuel processing device including the tank sealing valve according to claim 1, wherein
the first port is connected with the fuel tank,
the second port is connected with the canister, and
the third port is connected with the canister through the second valve unit.

8. The evaporation fuel processing device according to claim 7, wherein
when the control portion releases a positive pressure generated in an interior of the fuel tank, the control portion opens the first valve unit after opening the second valve unit.

9. The evaporation fuel processing device according to claim 7, further comprising:
a passage between the first port and the fuel tank; and
a passage between the third port and the canister, wherein
the passage between the first port and the fuel tank has a minimum diameter greater than a minimum diameter of the passage between the third port and the canister.

10. The evaporation fuel processing device according to claim 7, further comprising:
a passage between the third port and the canister, wherein
the passage between the third port and the canister has a minimum diameter greater than a minimum diameter of the through passage.

11. The evaporation fuel processing device according to claim 9, wherein
the passage between the third port and the canister has a minimum diameter greater than a minimum diameter of the through passage.

12. The evaporation fuel processing device according to claim 2, further comprising:
a relief valve that is a check valve opened by a negative pressure generated in an interior of the fuel tank, the relief valve arranged between the fuel tank and the canister in a parallel relationship with the tank sealing valve.

13. The evaporation fuel processing device according to claim 7, further comprising:
a relief valve that is a check valve opened by a positive pressure generated in an interior of the fuel tank, the relief valve arranged between the fuel tank and the canister in a parallel relationship with the tank sealing valve.

14. The tank sealing valve according to claim 1, further comprising:
a valve seat to which a valve portion of the second valve unit is seated, the valve seat arranged at an outer surface of the outer case body.

15. The evaporation fuel processing device according to claim 2, wherein
the tank sealing valve further includes a valve seat to which a valve portion of the second valve unit is seated, and
the valve seat is arranged at an outer surface of the outer case body.

16. The evaporation fuel processing device according to claim 7, wherein
the tank sealing valve further includes a valve seat to which a valve portion of the second valve unit is seated, and
the valve seat is arranged at an outer surface of the outer case body.

* * * * *